(12) United States Patent  (10) Patent No.: US 7,713,602 B2
Shiokawa et al.  (45) Date of Patent: May 11, 2010

(54) PACKAGING MATERIALS AND PACKING CONTAINERS USING THE SAME

(75) Inventors: Shunichi Shiokawa, Tokyo (JP); Shingo Masai, Hirosima (JP)

(73) Assignees: Toppan Printing Co., Ltd., Tokyo (JP); Aohata Corporation, Hiroshima (JP)

( * ) Notice: Subject to any disclaimer, the term of this patent is extended or adjusted under 35 U.S.C. 154(b) by 684 days.

(21) Appl. No.: 10/490,554

(22) PCT Filed: Oct. 2, 2002

(86) PCT No.: PCT/JP02/10240

§ 371 (c)(1), (2), (4) Date: Oct. 22, 2004

(87) PCT Pub. No.: WO03/031278

PCT Pub. Date: Apr. 17, 2003

(65) Prior Publication Data

US 2005/0042399 A1  Feb. 24, 2005

(30) Foreign Application Priority Data

Oct. 2, 2001 (JP) .............................. 2001-306863

(51) Int. Cl.
*B32B 7/00* (2006.01)
*B32B 27/00* (2006.01)

(52) U.S. Cl. .................... 428/35.7; 428/34.1; 428/34.9; 428/213; 428/215

(58) Field of Classification Search .............. 428/35.7, 428/34.1, 34.9, 213, 215
See application file for complete search history.

(56) References Cited

FOREIGN PATENT DOCUMENTS

| EP | 1 138 476 A1 | * | 10/2001 |
|---|---|---|---|
| JP | 61-255856 | | 11/1986 |
| JP | 6-100042 | | 4/1994 |
| JP | 406115569 A | * | 4/1994 |
| JP | 8-48370 | | 2/1996 |
| JP | 9-277672 | | 10/1997 |
| JP | 9-314719 | | 12/1997 |
| JP | 409314719 A | * | 12/1997 |
| JP | 11-277667 | | 10/1999 |

OTHER PUBLICATIONS translation of JP409314719A, Yagi et al.*
English translation of JP406115569A, Tomatsuri et al. (see above).*
English translation of JP409314719A, Yagi et al.*

* cited by examiner

*Primary Examiner*—Brent T O'Hern

(57) ABSTRACT

Packaging containers for foods in which the contents can be safely kept and which give no metallic residue after incineration. A bag made of a film material wherein a light-blocking printed layer (4) having a sepia printed layer (7) is provided on the internal face of the bag. The color of the sepia printed layer (7) is controlled to give a color hue of 5R to 10R in the Mansell color system, a lightness of 5 to 7 and a chroma of 0 to 3, while the light (300 to 800 nm) permeability of the packing material (1) is controlled to 10% or less.

7 Claims, 2 Drawing Sheets

PACKAGING MATERIALS AND PACKING CONTAINERS USING THE SAME

TECHNICAL FIELD

The present invention relates to a packaging material which applies for a packaging container to keep contents such as foods and packaging containers using the same.

BACKGROUND ART

In recent years, marketing products in packaging containers such as retort pouch and the like which keep foods as contents are required to avoid alterations of food tastes and of the qualities during a period from the production of products until eating by customers. Therefore, packaging materials provided a light blocking property by a lamination of films with metal foils such as aluminum or a vapor deposition layer, are used for such packaging materials.

On the other hand, since retort foods and the like provided by the above mentioned packaging containers are widely commonly distributed and consumed, packaging containers made by the above mentioned packaging materials come into circumstances to be disposed as wastes, and in case of a thermal disposal of packaging containers, the fact that metal portions in packaging materials remain as residues in incinerators, is acknowledged as a problem.

From this point of view, in order to acquire a light-blocking property without the use of metals such as aluminum, a colored printed layer formed in layer constructions of packaging materials has become to be tried. While, the forming of a color printed layer has big advantages to reduce production costs because it can be easily conducted by printings during productions of packaging materials, in case that a color printed layer is formed by an all-over printing with black color which has a great effect for acquirement of a light-blocking, it is not applicable for food packaging materials in appearance, and in case that an all-over printing in white color provides drawbacks of insufficiency for light-blocking property.

DISCLOSURE OF INVENTION

The object of the present invention is to provide that a color printed layer in layer structures of packaging materials is prepared in order to acquire a light-blocking property of packaging materials and an external appearance of packaging containers comes into an applicable hue as containers for keeping foods and the purpose is to obtain packaging containers for foods where contents are kept stably and no metal residues result in case of incinerations being conducted.

The present invention is provided under considerations of the above mentioned object and relates to solve the above mentioned subject by proposing where packaging materials have layer structures in which, when a bag is formed, a sealant is in a position of the internal side, and a base material film is in a position of the external side of a bag, and a light-blocking printed layer is in a position between the above mentioned sealant and the base material film, and the aforementioned light-blocking printed layer comprises a sepia printed layer of which is printed by a sepia color ink, where the color of the aforementioned sepia colored layer has a color hue of 5R to 10R, a lightness of 5 to 7, and a chroma of 0 to 3 in the Mansell color system, and a light permeability of packaging materials is 10% or less at the wavelength of 300 to 800 nm.

According to the present invention, in packaging materials, they are required to comprise a gas barrier layer. A gas barrier layer comprises a transparent gas barrier film where a gas barrier layer can be prepared by way that it is laminated by a combination of the aforementioned transparent gas barrier film with the above mentioned base material film and also a gas barrier layer comprises a transparent gas barrier film where a base material film can be provided as a gas barrier layer and as the above mentioned base material film is the above mentioned transparent gas barrier film.

Moreover, in the above mentioned packaging materials according to the present invention, in order to get rid of a possibility of odor ingredient migration from the above mentioned light-blocking printed layer to the internal side of a bag, it is preferable that the odor ingredient barrier layer is provided between the above mentioned light-blocking printed layer and a sealant layer.

Further it is preferable that layer structures of packaging materials have a layer of an impact resistance to absorb an impact.

And further, another feature of the present invention is to provide packaging containers to solve the above mentioned problem where a bag made up of the above mentioned packaging materials are heat-sealed on packaging materials laid on each other after contents are contained.

According to the present invention, a permeability of visible light rays which causes alterations of food qualities provided for such as retort packaging can be protected without providing metal foils and vapor deposition films in structure of layers, and even in visually observable state, a sepia colored printed layer makes a warm feeling as a specified color and suitable packaging containers for foods are obtainable as packaging materials. Moreover, packaging containers are made to protect securely from influences of odor ingredients of printing inks used for light-blocking layers to contents by providing a barrier layer.

And, packaging containers made by using the packaging materials provide excellent effects for such practical applications as preventing alterations of content qualities before opening bags and producing no residues of metallic materials by incineration after opening, accordingly being able to conduct with incineration easily.

BEST MODE FOR CARRYING OUT THE INVENTION

Figure 1:
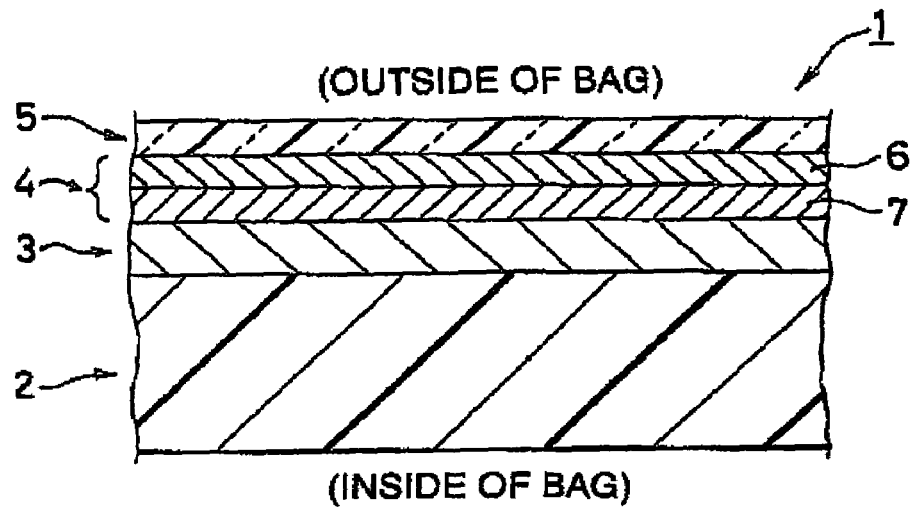
FIG. 1 illustrates a layer structure in an example of packaging materials according to the present invention.
Figure 2:
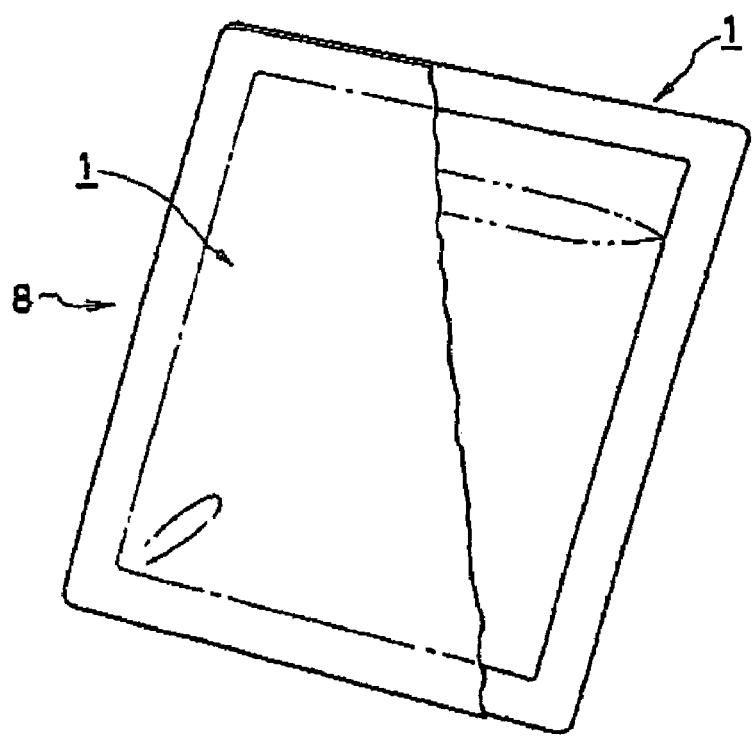
FIG. 2 illustrates an example of packaging containers according to the present invention.
Figure 3:
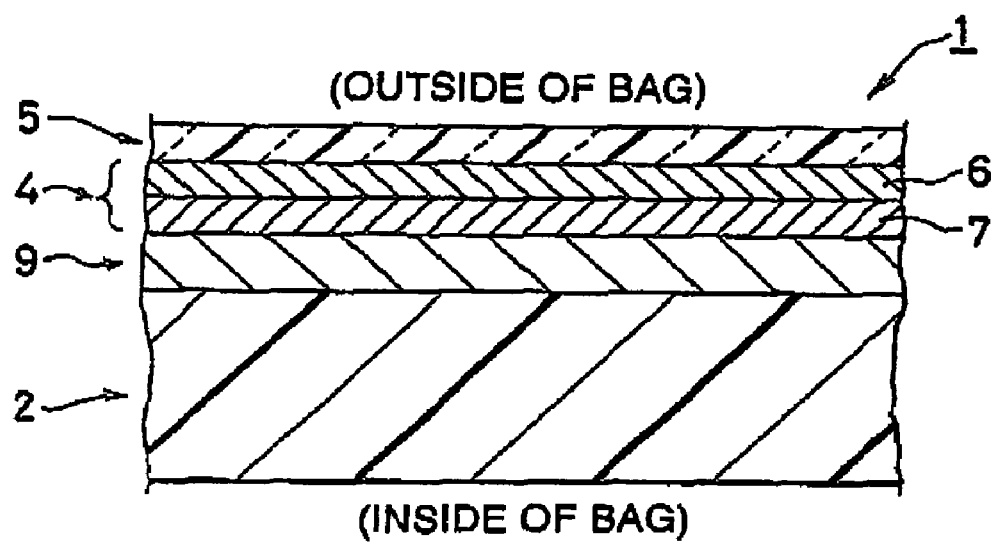
FIG. 3 illustrates a layer structure in another example of packaging materials according to the present invention.

With reference to the drawings in FIGS. 1, 2 and 3, the preferred embodiments will be illustrated in detail as following.

FIG. 1 is one example of packaging materials according to the present invention, said packaging container is provided to obtain by wrapping and sealing such as foods by the packaging material 1 where the packaging material 1 is prepared that in a bag being formed, the sealant 2 is in a position of the internal side of the bag and the packaging material 1 is laid in a state of facing the sealant layers and heat-sealed on the required edges. And the packaging material 1 comprises from the internal side of the bag to the external side of the bag as laminated layers having a structure of layers of the afore mentioned sealant 2, an intermediate base material layer 3, a light-blocking printed layer 4, and a base material film layer 5.

In the structure of the packaging material 1, the above mentioned sealant 2 comprises resins such as non-oriented polypropylene and the like having heat-sealability with the thickness range of approximately from 30 to 120 µm. The intermediate base material layer 3 comprises resins such as oriented nylon resin and the like with the thickness range of approximately from 15 to 25 µm. And, the base material film layer 5 comprises a transparent gas barrier film with the thickness range of approximately from 12 to 20 µm wherein mono- or bi-axially oriented film of the thermoplastic resin such as polyethylene terephthalate (PET), polypropylene (PP), or nylon (Ny), etc. is given gas-barrier properties (prevention of oxygen permeation, moisture proof) with a vapor deposition treatment by inorganic materials such as silicon oxide or aluminum oxide or the like. For transparent gas barrier films, besides transparent vapor deposition films, gas barrier films having barrier properties such as EVOH (saponified ethylene-vinyl acetate copolymer resin) film, PVDC (polyvinylidene chloride resin),etc., and barrier coated films provided with coating layers having barrier properties, can be used.

And the packaging material 1 is provided that the afore mentioned light-blocking printed layer 4 being formed by printing method to the one side of the inner bag of the base material film comprising the aforementioned base material film layer 5 and to the side of the light-blocking printed layer 4, resins comprising the above mentioned intermediate base material film layer 3, and the afore mentioned non-oriented polypropylene film having heat-sealability for sealant, are successively laminated, in the presence of adhesive agents by, for example, dry lamination method and the like.

The light blocking printed layer 4 comprises the laminate of the white colored printed layer 6 prepared by printing on the base material film comprising the above mentioned base material film 5 and the sepia colored layer 7 which is printed by a sepia ink to the white colored printed layer 6. And the aforementioned sepia color printed layer 7 is prepared by printing with a sepia ink, and said sepia color printed layer 7 has a color hue of 5R to 10R, a lightness of 5 to 7, a chroma of 0 to 3 in the Mansell color system. By specifying the color of the aforementioned sepia color printed layer 7 as mentioned earlier, a suitable light blocking is provided as packaging materials in order to obtain packaging containers for food retort pouch type and the like, and the light permeability of the packaging material is 10% or less at wavelength (visible light) of 300 to 800 nm.

And the packaging container can be made a bag by using the packaging material 1 having the above mentioned light blocking performance, for example the packaging container 8 is obtained as shown in FIG. 2 in which one direction opened bag is prepared by previously heat sealed three edge-parts of the two pieces of packaging materials laid on as the above mentioned sealant 2 facing each other, and then after foods are inserted, the opened side is heat sealed to enclose contents by sealing four edge-parts by heat sealing.

As described above, in the packaging material itself, the deterioration of foods can be provided to prevent because the permeation of the packaging material is made to 10% or less at the wavelength of 300 to 800 nm. On the other hand, it is confirmed to give the deterioration (big color change, stale taste) by receiving the visible light of the range of wavelength from 300 to 800 nm depending on contents kept in the conventional retort pouch type packaging containers (touch upon later). Therefore, the packaging container 8 comprising the packaging material 1 having the above mentioned light-blocking performance is highly effective containers regarding not to give taste changes and alterations of content qualities.

Moreover, in a state of viewing the packaging container 8 from the outside, the white printed layer 6 in the above mentioned light-blocking layer 4 is in a visible state where containers contained foods project high freshness. Moreover, in case that viewing from the inside after a bag is opened, a sepia color becomes in a visible state, and the color hue has a sense of comfort as containers contained foods. Further, although the aforementioned white color printed layer 6 is provided in the light-blocking printed layer 4, the light blocking printed layer 4 can be prepared by the lamination of only the base material film layer 5 and the sepia color printed layer 7, directly so as to provide the sepia color printed layer 7 by omitting the white color printed layer 6, and even in the case of viewing from the inside and outside of the packaging container 8, a sepia color of the sepia color printed layer 7 can be viewed and as the container contained foods, a calm and warm feeling appearance can be given without a feeling of discomfort.

Furthermore, in the abovementioned packaging material 1, a gas barrier layer being provided in the base material film layer 5 is not limited and can be provided between the base material film layer 5 and sealant 2 or in the sealant 2. Also the gas barrier layer can be provided not limited to one layer but any number of layers.

As described above, the intermediate base material film 3 is provided by transparent resins such as oriented nylon resin and the like where an impact resistance and a pinhole resistance of packaging materials are improved when the intermediate base layer 3 having high impact oriented nylon film to absorb an impact is made for an impact absorption layer. Furthermore, even by using the oriented nylon film as the base material film layer or gas barrier layer, the layer becomes to provide an additional role as an impact absorption layer to contribute an improvement of an impact resistance and pinhole resistance of the packaging material 1. Moreover, it is possible to provide the impact absorption layer formed by the oriented nylon film between the sealant and the intermediate base layer.

Laminations between each of the above mentioned film are possibly applied by dry lamination, extrusion coating and non-solvent lamination and the like.

Meanwhile, the above mentioned light blocking printed layer 4 can be formed by normal gravure printing and other printing methods by applying oily or water printing ink. And since printing inks used for packaging materials have peculiar odors caused by pigments, binders, and other ingredients (hereinafter odor ingredients) and additionally organic solvents in case that oily printing inks, odor ingredients in the light-blocking printed layer can be migrated to contents in bags made by packaging materials, and in case of migration, sometimes contents become ill flavors. Influences of odor ingredients generate particularly by heat treatments such as boiling and retort (normally sterilization purpose).

According to the conventional packaging materials by the use of metal foils, odor ingredients of printed layer positioned at the external side causes no problems such as migration to contents because metal foils block odor ingredients and deteriorations of flavors by odor ingredients cause less problem if the amount of ink for the general thickness (an amount of ink) for printing of images but in case that the light-blocking printed layer for the purpose of light-blocking, the thickness to the printing layer (an amount of ink) has a tendency to be thicker (larger amount) than normal printing, so that deteriorations of flavors can sometimes become a problem.

Accordingly when there is a possibility of migration of odor ingredients to contents, it is necessary to eliminate the possibility. Therefore, with respect to the packaging material provided the light-blocking applying the light blocking printed layer in the layer structure, the following preferable examples are shown to eliminate even the possibility of the odor ingredient migration.

Namely, as shown in FIG. 3, it is preferable that the packaging material providing the layer structure of lamination being conducted from the internal side of the bag to the external side of the bag, setting as the sealant 2, the odor ingredient barrier layer 9, the light-blocking printed layer 4 and the base material film layer 5. The above mentioned odor ingredient barrier layer 9 to be positioned between the light-blocking printed layer 4 and the sealant 2, should have impermeability or blocking against odor ingredients to the internal side of the bag caused by printing ink in the light-blocking printed layer 4, where the transparent gas barrier film (inorganic materials such as silicon oxide or aluminum oxide (alumina) vapor deposition film on mono- or biaxial-oriented film of thermoplastic resin films (Toppan Printing Co., Ltd. Trade name GL Film, and the like) which can be used for the base material film layer 5, is suitable for use, and other films such as polyethylene terephthalate, polyvinylidene chloride, saponified ethylene-vinylacetate copolymer film, m-xylylenediamine base nylon (MXD-Ny), etc. and films coated by barrier coating resin can also be used.

Additionally, the oriented nylon film giving an excellent impact absorption layer can be provided to the above mentioned example, between the sealant 2 and the odor ingredient barrier layer 9 in order to absorb an impact. Moreover, as the base material film layer or gas barrier layer, the layer using the oriented nylon film can be provided so as to give a role of impact absorption layer.

Besides dry lamination, extrusion coating and non-solvent lamination and the like can be applied for lamination between each of the above mentioned film.

The concrete examples of layer structures of packaging materials providing the light blocking printed layer and equally providing the above mentioned odor ingredient barrier layer are shown as follows.

PET (base material film layer)/light blocking printed layer/adhesive layer/aluminum oxide vapor deposition PET (odor ingredient barrier layer where PET is adhered with aluminum oxide vapor deposition)/adhesive/CPP(sealant)

PET(base material film layer)/light blocking printed layer/adhesive layer/aluminum oxide vapor deposition Ny (odor ingredient barrier layer where Ny is adhered with aluminum oxide vapor deposition)/adhesive/CPP(sealant)

aluminum oxide vapor deposition PET(base material film layer)/light blocking printed layer/adhesive layer/aluminum oxide vapor deposition PET(odor ingredient barrier layer)/adhesive/CPP(sealant)

PET(base material film layer)/light blocking printed layer/adhesive layer/aluminum oxide vapor deposition PET (odor ingredient barrier layer)/adhesive/ONy(impact absorption layer)/adhesive/(CPP(sealant)

PET(base material film layer)/light blocking printed layer/adhesive layer/aluminum oxide vapor deposition PET (odor ingredient barrier layer/adhesive/(Ny/CPP) co-extrusion film(impact absorption layer and sealant)

Here, PET is the abbreviation for polyethylene terephthalate film, ONy for oriented nylon film, CPP for non-oriented polypropylene film. Also, (Ny/CPP) co-extrusion film comprises lamination film of non-oriented nylon film and non-oriented polypropylene film.

The results of the light permeation of every packaging material are obtained and equally the organoleptic test on contents are shown where Example 1 provides a bag made by a packaging container from the packaging materials shown in the following structure, and Comparative Example 1 for a gray color printed layer as a substitute for the sepia color printed layer in said Example and the Comparative Example 2 for a white color printed layer.

Every layer thickness excluding the light blocking printed layer in the layer structure is as follows: polyethylene terephthalate which is aluminum oxide vapor deposition to the base material film as the barrier layer: 12 μm, the oriented nylon film (adhesive layer) as the intermediate base film layer: 15 μm, and the non-oriented polypropylene film as the sealant: 70 μm.

The inks for printing of each printing layer in Example 1, Comparative Example 1, and Comparative Example 2 are as follows.

White color printed layer: lightness N 9.5

Gray color printed layer: color hue 7YR, lightness 6.7, chroma 0

Sepia color printed layer: color hue 8R, lightness 6.5, chroma 1

Printing plate is a gravure printing having 175 lines, plate depth 35 μm Light permeability is measured by spectrophotometer (Shimazu Seisakusho Co., LTD. UV-3100)

Contents of the packaging container are meat sauce, and after retort sterilizing at 121° C. for 30 minutes, an integral illumination as luminescent lamp 1500 lux (4 weeks, 8 weeks) is conducted.

No change of the light permeation of the packaging material is obtained after the retort sterilization.

Oxygen permeability after the retort sterilization of the packaging material in Example 1, Comparative Example 1, and Comparative Example 2 are 16.0 ml/m$^2$·day·MPa, respectively. Also oxygen permeability is measured under the condition of 30° C., 70% RH according to MOCON method.

TABLE 1

| | light blocking printed layer | light transmittance (%) | organoleptic test |
| --- | --- | --- | --- |
| Example 1 | white color printed layer/ white color printed layer/ sepia color printed layer | 6.7 | ○ |
| Comparative Example 1 | white color printed layer/ white color printed layer/ gray color printed layer | 13.8 | X |
| Comparative Example 2 | white color printed layer/ white color printed layer/ white color printed layer | 27 | X |

(Evaluation)

The flavor of meat sauce was conducted for the organoleptic test. Results are shown as in Table 1, Example 1 provides that the contents retained a flavor giving OK (○), and Comparative Examples 1 and 2 provide that the contents were not retained the flavor giving NG (X).

Therefore, it is concluded that the packaging material having the sepia color printed layer in the light-blocking printed layer provides to prevent from the visible light permeation of the range of 300 to 800 nm, so that the packaging material is suitable for the packaging container to keep the retort foods.

Then, Example 2 according to the present invention and Comparative Example 3 where the packaging material providing an odor ingredient barrier layer is provided as the following structure and observed a migration of an odor ingredient by a method described below.

<The layer Structure of the Packaging Material Having the Odor Ingredient Barrier Layer in Example 2>

PET(base material film layer)/light blocking printed layer/adhesive layer/aluminum oxide vapor deposition PET (odor ingredient barrier layer)/adhesive/ONy(intermediate base material layer)/adhesive/CPP(sealant)

A light-blocking-printed layer is formed on PET film having thickness 12 μm as the same manner to the above mentioned Example 1. The light-blocking printed layer is laminated with a transparent barrier film which is provided by 12 μm thick PET film having 50 nm aluminum oxide vapor deposition layer (Toppan Printing Co., Ltd. GL Film (trade name)) as the odor barrier layer by means of dry lamination method (The vapor deposition face is positioned to sealant side.). Subsequently, the packaging material of the present invention is prepared where 15 μm thick biaxially oriented 6,6 nylon film (as intermediate base material layer), and 60 μm non-oriented polypropylene film(as sealant) are laminated in subsequent manner on the aluminum oxide vapor deposition layer by means of dry lamination method.

<The Layer Structure of Comparative Example 3> aluminum oxide vapor deposition PET (base material film layer)/light blocking printed layer/adhesive layer/ONy (intermediate base material layer/adhesive/CPP(sealant)

A light blocking printed layer is formed as same in Example 2 where a transparent barrier film which is provided by 12 μm thick PET film having 50 nm aluminum oxide vapor deposition layer (Toppan Printing Co., Ltd. GL Film(trade name)). The Comparative Example 3 packaging material is prepared that biaxially oriented 6,6 nylon film (as intermediate base material layer) as same as in Example 2 and 60 μm non-oriented polypropylene film(as sealant) are laminated in successive manner on the aluminum oxide vapor deposition layer by means of dry lamination method as same as in Example 2.

The both show enough light-blocking properties for food storage packaging material where the total light permeability (Measurement apparatus: Shimazu spectrophotometry) is 10% or less.

By applying the packaging material, a four-side seal bag of the size 130 mm by 180 mm is made and after 200 ml of distilled water filled as content and sealed, a retort treatment was conducted at 121° C. for 30 minutes. Subsequently the content (distilled water) was analyzed by GC-MS analytical apparatus made by Agilent Technologies.

The both show 10% or less on total light permeability after retort sterilization.

The oxygen permeability after retort sterilization of the packaging material in Example 2 is 14.0 ml/m²·day·MPa, and Comparative Example 3 is 16.0 ml/m²·day·MPa. The oxygen permeability is measured under the condition of 30° C., 70% RH by MOCON method.

As a result, the ingredient supposedly caused by printing ink is observed only in Comparative Example 3. Also, according to the organoleptic test for both contents, no foreign odor was detected in Example 2 but a subtle foreign odor was found in Comparative Example 3.

Therefore, Example 2 is concluded the packaging material as suitable to obtain the packaging container to keep retort food.

INDUSTRIAL APPLICABILITY

According to the present invention, a permeation of a visible light causing deteriorations of foods in retort and the like can be prevented without having the metal foils or metal vapor evaporation film in a layer construction and also a suitable packaging material can be prepared for a packaging container of food contents where a sepia printed layer gives a warm feeling color as specified even in a state of visual observation. Moreover, a packaging material becomes to prevent securely an influence to contents from an odor ingredient in printing ink used for the formation of the light-blocking printed layer by providing an odor ingredient barrier layer.

The invention claimed is:

1. A packaging material comprising:
 a layer structure having a sealant positioned on an internal side, and a base material film positioned on an external side;
 a light-blocking printed layer positioned between the sealant and the base material film in a bag being formed; and
 an odor ingredient barrier layer provided between the light-blocking printed layer and the sealant, wherein
 the light-blocking printed layer includes a white-colored printed layer printed by a white-colored ink and a sepia printed layer printed by a sepia ink on the white-colored layer, and a color of the sepia printed layer has a color hue of 5R to 10R, a lightness of 5 to 7, and a chroma of 0 to 3 in the Munsell color system,
 a light permeability of the packaging material is 10% or less at wavelengths of 300 to 800 nm,
 the odor ingredient barrier layer is configured to have impermeability or block against odor ingredients, caused by pigments and binders in the white-colored ink and the sepia ink of the light-blocking printed layer, to an internal side of the bag, and
 an entire bottom surface of the odor ingredient barrier layer is in direct contact with an entire upper surface of the sealant.

2. The packaging material according to claim 1, wherein the packaging material comprises an impact resistance layer which absorbs an impact.

3. The packaging material according to claim 1, wherein the odor ingredient barrier layer is selected from the group consisting of a mono- or biaxial-oriented film of thermoplastic resin on which an inorganic material is vapor deposited, polyethylene terephthalate film, polyvinylidene chloride film, saponified ethylene-vinylacetate copolymer film, m-xylylenediamine (MXD) base nylon film, and a film coated by a barrier coating agent thereon.

4. The packaging material according to claim 1, wherein the odor ingredient barrier layer comprises resins and has a thickness in the range of 15 to 25 μm.

5. The packaging material according to claim 1, wherein the packaging material further comprises a gas barrier layer configured to prevent oxygen permeation and be moisture proof.

6. The packaging material according to claim 5, wherein the gas barrier layer comprises a transparent gas barrier film and said gas barrier layer is formed as a lamination of the base material film combined with the transparent gas barrier film.

7. The packaging material according to claim 5, wherein the gas barrier layer comprises a transparent gas barrier film and the base material film is formed as the gas barrier layer, the base material film being the transparent gas barrier film.

* * * * *